United States Patent
Peters et al.

(10) Patent No.: US 12,012,309 B2
(45) Date of Patent: Jun. 18, 2024

(54) INTUITIVE CONTROL OF LIFTING EQUIPMENT

(71) Applicant: Construction Robotics, LLC, Victor, NY (US)

(72) Inventors: Scott Lawrence Peters, Pittsford, NY (US); Glenn Dayton White, Conesus, NY (US)

(73) Assignee: Construction Robotics, LLC, Victor, NY (US)

( * ) Notice: Subject to any disclaimer, the term of this patent is extended or adjusted under 35 U.S.C. 154(b) by 685 days.

(21) Appl. No.: 17/100,929

(22) Filed: Nov. 22, 2020

(65) Prior Publication Data

US 2021/0154833 A1   May 27, 2021

Related U.S. Application Data

(60) Provisional application No. 62/939,145, filed on Nov. 22, 2019.

(51) Int. Cl.
*B66C 13/18* (2006.01)
*B25J 9/16* (2006.01)
*B25J 13/06* (2006.01)
*B25J 13/08* (2006.01)
*B66F 9/065* (2006.01)
(Continued)

(52) U.S. Cl.
CPC ............. *B66C 13/18* (2013.01); *B25J 9/1628* (2013.01); *B25J 13/06* (2013.01); *B25J 13/08* (2013.01); *B25J 13/088* (2013.01); *B66F 9/065* (2013.01); *B66F 9/0655* (2013.01); *B66F 9/0759* (2013.01); *B66F 9/20* (2013.01); *B66F 9/24* (2013.01); *E04G 21/16* (2013.01); *G05B 17/02* (2013.01); *B25J 13/065* (2013.01)

(58) Field of Classification Search
CPC ....... B66C 13/04; B66C 13/063; B66C 13/08; B66C 13/085; B66C 13/16; B66C 13/18; B66C 13/40; B66C 13/44; B66C 13/46; B66C 15/045; B66C 17/00; B66C 19/002; B66C 23/54; B66C 23/88; B66C 23/94; G06Q 10/06; G06Q 10/0631; G06Q 10/20; G05B 13/027; G05B 13/048; G05B 23/0283; B66D 3/18; G01D 5/2006; G01D 5/2208
See application file for complete search history.

(56) References Cited

U.S. PATENT DOCUMENTS 8,881,919 B2 *  11/2014  Benton .................. B66C 13/18
                                                           212/277
11,008,199 B2 *  5/2021  Appling, Jr. .......... B66C 15/045
(Continued)

FOREIGN PATENT DOCUMENTS

CA      2632138 A1 *  5/2007  ............. B66C 29/90
CN    101233070 A  *  7/2008  ........... B66C 13/063

*Primary Examiner* — Crystal J Barnes-Bullock
(74) *Attorney, Agent, or Firm* — Patent Technologies, LLC; Robert D. Gunderman, Jr.

(57) ABSTRACT

An intuitive control system for lifting equipment is described. The intuitive control system translates user defined inputs into machine expressions of movement that are in turn used to control a construction lift or similar piece of construction equipment. Orientation and relative position sensors may be incorporated into the translation and control system for correct user control of the lifting equipment in various operating conditions.

9 Claims, 7 Drawing Sheets

(51) Int. Cl.
      *B66F 9/075*       (2006.01)
      *B66F 9/20*       (2006.01)
      *B66F 9/24*       (2006.01)
      *E04G 21/16*       (2006.01)
      *G05B 17/02*       (2006.01)

(56) References Cited

U.S. PATENT DOCUMENTS

| | | | |
|---|---|---|---|
| 2012/0279938 A1* | 11/2012 | Benton | G01B 11/14 |
| | | | 212/277 |
| 2014/0200863 A1* | 7/2014 | Kamat | E02F 9/245 |
| | | | 703/1 |
| 2020/0062555 A1* | 2/2020 | Appling, Jr. | B66C 13/16 |

* cited by examiner

INTUITIVE CONTROL OF LIFTING EQUIPMENT

CROSS REFERENCE TO RELATED PATENT APPLICATIONS

This application claims priority to U.S. Patent Application Ser. No. 62/939,145 filed Nov. 22, 2019 entitled "intuitive Control of Lifting Equipment" by Scott Lawrence Peters et al., the entire disclosure of which is incorporated herein by reference.

BACKGROUND OF THE INVENTION

1. Field of the Invention

The present invention relates generally to construction lift equipment, and more particularly to systems and methods for the intuitive control of construction lift equipment.

2. Description of the Related Art

Construction lift equipment for the vertical and horizontal positioning and movement of workers, materials, and equipment typically operates through a series of controls that not intuitive to the user, more specifically they do not operate in a frame of reference that is natural to the user. These controls often include a lever or knob that opens and closes a hydraulic valve that in turn moves a portion of the lift. Construction lift equipment often comprises multiple segments or portions that move m both a linear and a radial or rotational manner. With such complexity, skill is required for proper placement and movement of the lift. With skill comes speed and efficiency, both of which add to the profitability of many construction jobs. Skill also reduces the risk of damage caused by the lift when it is moved in unintended ways that can result in damage to buildings and equipment, or injury to personnel.

In the construction industry, equipment is often rented, allowing a contractor access to the equipment and associated cost only for the period of time for which the equipment is needed. With such intermittent use, it can be difficult to develop a skilled operator, and as such, the operation of the machinery may be slow, inefficient, and sometimes potentially dangerous. The numerous control levers and knobs serve to add complexity to the operation of the lift, and are often slow and cumbersome to use, essentially non-intuitive for the user.

What is therefore needed is an intuitive control system that allows the user to operate the lift without the need for repetitive training and experience that are otherwise the hallmark of a skilled user.

BRIEF SUMMARY OF THE INVENTION

In accordance with the present invention, there is provided an intuitive control system for lifting equipment. The intuitive control system translates user defined inputs into machine expressions of movement that are in turn used to control a construction lift or similar piece of construction equipment. Orientation and relative position sensors are incorporated into the translation and control system for correct user control of the lifting equipment in various operating conditions.

The foregoing paragraph has been provided by way of introduction, and is not intended to limit the scope of the invention as described by this specification, claims and the attached drawings.

BRIEF DESCRIPTION OF THE DRAWINGS

The invention will be described by reference to the following drawings, in which like numerals refer to like elements, and in which.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification, claims and drawings attached hereto.

DESCRIPTION OF THE PREFERRED EMBODIMENTS

The present invention provides for intuitive control of lifting equipment as well as equipment with similar operating characteristics, such as concrete pump trucks and the like.

The intuitive control system of the present invention converts operation of the lifting equipment from a mainly spherical coordinate environment to an X-Y coordinate environment as presented to the user. This X-Y coordinate environment for control creates a user operating environment that is intuitive, predictable, and requires less skill and training for efficient operation.

Figure 1:
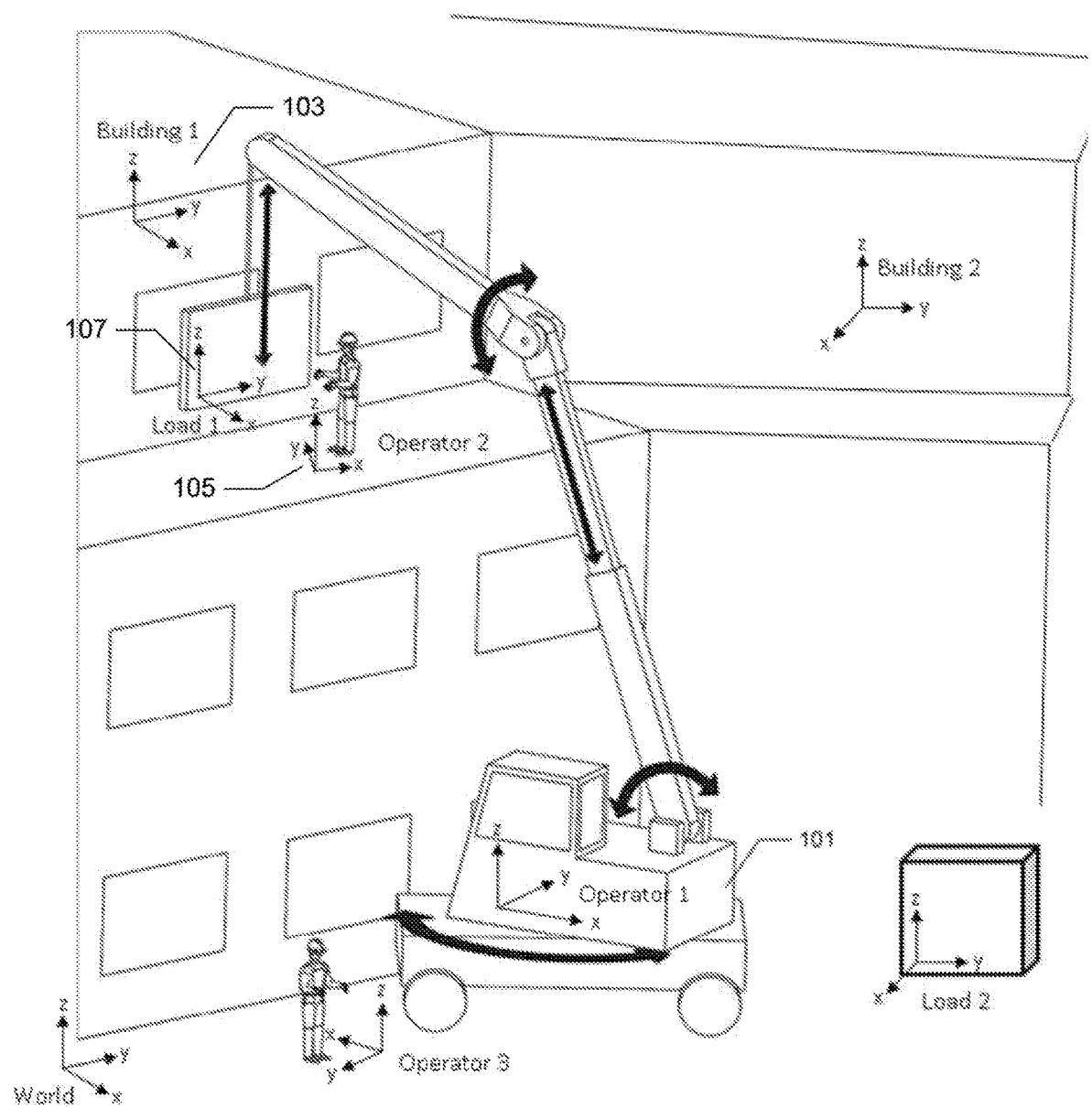
FIG. 1 depicts a typical construction lift and the movements associated with operation thereof.

FIG. 1 depicts a typical construction lift 101 and the movements associated with this lift. There are both rotational as well as linear movements that are controlled by a user. This multitude of movements provides for placement of the functional end (a hanging load for example) at a given point in space. This requires the user to operate several controls with the requisite training and skill needed to properly place the functional end in a desired location without damage to the surrounding build environment or injury to the user. The cumulative result of these movements is proper functional end placement. The present invention serves to provide an intuitive controller to the user for simplified, unified control of a lift or similar piece of equipment.

In order to control multi-axis lifting equipment in this complex manner, it is critical that the machine knows the position of each axis at all times. This information allows for the coordinate system transformation math to compute the correct commands. In some embodiments, this control transformation may be done as an external package to the rest of the machine. In this case it may be necessary to add additional sensors to the machine to sense these vital position measurements. Sensors may also be necessary for semi-autonomous control, mapping, validation, safety, and the like. Sensors may include, but are not limited to, encoders, position sensors, cameras and machine vision, and the like. It is foreseeable that in this and similar embodiments there is a method for the external control system to "learn" the axes through a teach routine where it issues commands to the machine and senses the reactions. This allows for motion control that is specifically tailored to that machine.

Cameras and machine vision arrangements may also image the posture of the equipment, and may perform safety based guided controls using AI, preventing unsafe actions and potentially an accident.

In some embodiments, the user can control the machine in multiple frames of reference. The controls may be in a fixed position on the machine, or may, in other embodiments, have remote capabilities. Potential frames of reference include load, user, cab, joint motions, and the like. The frame of reference of the controller, load or machine is sensed relative to the surroundings (gravity, orientation, magnetic compass, external sensors) to change how the user's inputs are translated to machine commands. Using FIG. 1 as an example, Operator 105 can give inputs in relation to where be/she is standing. These inputs must then be translated into the coordinate system of the construction lift 101 in order to be executed.

In some embodiments, the present invention includes "deadband filters", and may include the ability to snap to a reference (i.e., cardinal axis). For example, if a controller is held at 85 degrees with respect to gravity, it would behave as if it was 90 degrees to gravity.

Figure 7:
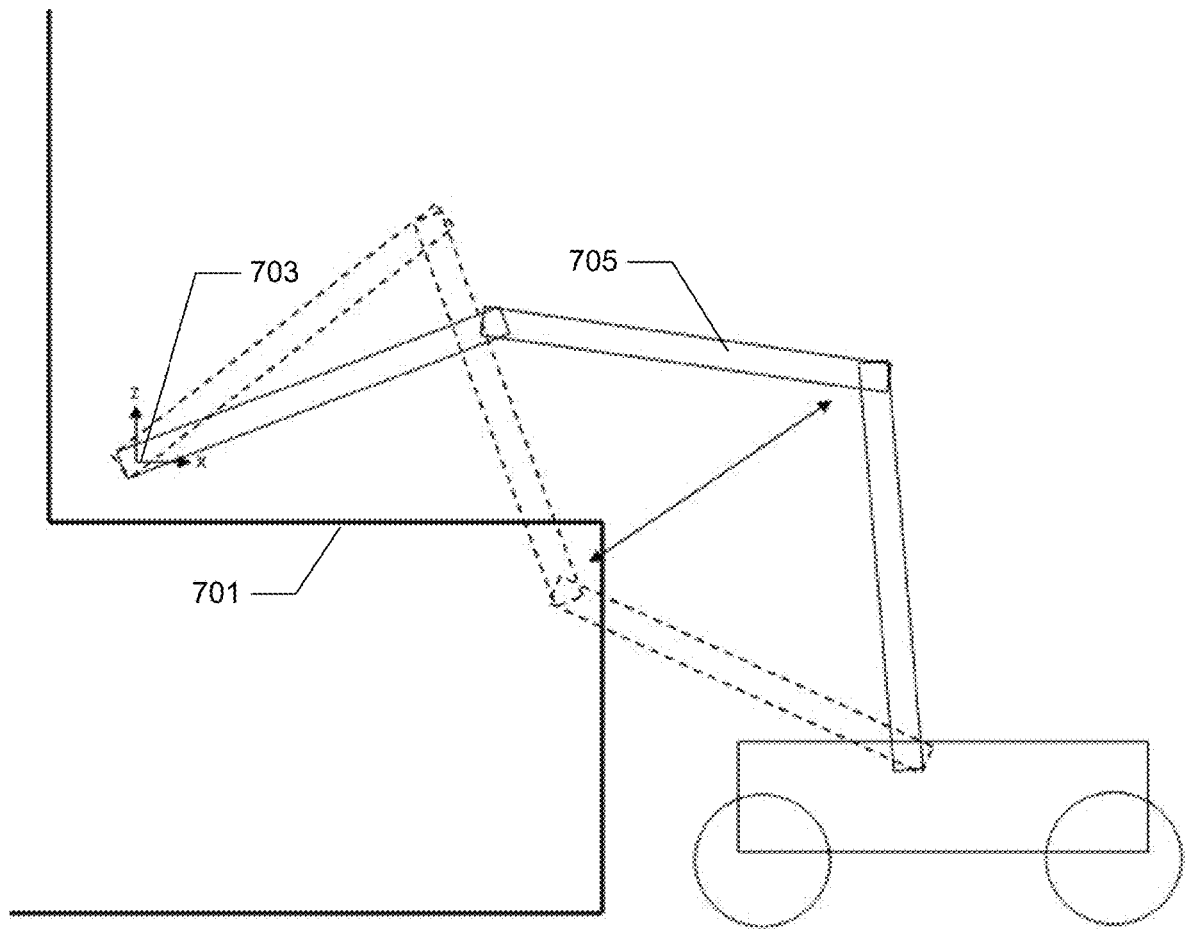
FIG. 7 is an example of posture change in accordance with some embodiments of the present invention.

Frames of reference for machine motion include the output of a controls scheme that may include both rotational and translational degrees of freedom in any relative coordinate frame. This controls scheme allows motion relative to any user created frame of reference, such as rotating a "load" around a pole, following an arbitrary line, and the like. Through the use of machine sensors and/or external data (BIM and the like), it is foreseeable that the lift 101 can traverse the load 107 along building 103 while preventing collisions with the building. In some embodiments this may require changes in machine posture as shown in FIG. 7. Definition and control of such semi-autonomous functionality requires inputs including load data, arm posture, base location, and other machine outputs and related components.

The construction environment presents many obstacles that create the risk of collision and subsequent damage during machine use. In some embodiments, the controller of the present invention provides a way to change the posture of the machine independent of the "load" location. As can be seen in FIG. 7, machine 705 can be reoriented independently of the load point 703 in order to avoid obstacle 701. Obstacle 701 can be detected through a multitude of methods including but not limited to machine sensors and external data sources.

In some embodiments, multiple user input controllers may be employed. Locations of these controllers include, but are not limited to, the machine cab, remote location, ground, and the like. In some embodiments, nearly any controller can work in any frame of reference depending on user input, while in other embodiments the reference frames may remain fixed for each controller. A safety interlock will allow only one operator at a time to control the system. There is a handoff mechanism to ensure that one user retains control until given up or accepted, excluding any safety controls.

In some embodiments, the machine may interface with or be operated by (partially or fully) operators that are removed from the machine beyond traditional limits. It is foreseeable that the operator could be stationed across the construction site or much longer distances. In these cases communications can be performed over the Internet or the like (tele-operation).

In some embodiments, a controls scheme allows for some portions of the machine motion to be semi-automated or automated. Possible uses include allowing the machine to traverse a learned path between two points. It is foreseeable that the machine could follow a path that an operator has previously taken with defined start and end points. Combined with other embodiments, this can allow for the nearest person to the load to be the one in control at all times improving operational safety. In some embodiments, this semi-automated functionality may be turned on or off through an enable controlled by the user. Other embodiments may incorporate autonomous or semi-autonomous activation and de-activation of this semi-automated functionality. Appropriate safety features may also be employed before, during and after enablement/disablement of the semi-automated routines.

The user interface of the present invention may, in some embodiments, provide user input through multiple styles of control, based on what is most applicable for a given task. Inputs may include force, displacement, standard push buttons, accelerometers, touchscreen, joysticks, and the like. The user interface may provide feedback to the user based on sensing of the environment, machine status, and the like. Feedback may be provided through visual, audible, haptic or other means. For example, orientation of the controller with respect to the machine may be sensed, with subsequent actions being taken in the control environment to compensate for, or otherwise adjust or correct for orientation.

In some embodiments, understanding the orientation of the user interface is vital to effective control of the overall machine. For example, if the user specifies that the movement of the machine should be to the left, the machine must move the load to the user's left and not the machine's left. To accomplish this, there is sensing to detect the relative location and/or translation of the user input station. This sensing may be done through rotational means (magnetometer, gyroscopes, accelerometers, gravitational) or translational means (line of sight distance, lasers, ultrasound, lime of flight); absolute measurements (Global Navigation Satellite Systems and other advanced techniques that allow for centimeter precision, radio links from a fixed beacon). Multiple measurements of translation may be used to derive rotation. In many cases these sensors will be needed on both the user interface and the machine in order to gel accurate local differential in signals. The output of these measurements is the differential between the machine and the user interface. This allows for the user's commands to be known in terms of machine orientation. From there the control system can assess the best axis combination for the machine to use to achieve the desired motion, while also considering any posture requirements based on the application.

These sensors allow for computation of the difference between the user input and the machine action. Additional sensors may be needed to understand machine orientation (for example, is the machine sitting on an incline) to properly control the machine.

In some embodiments, the user control station may be fixed in relation to the overall machine. In these cases, sensors may not be required, as the "differentials" could be pre-programmed into the machine for these controls.

In many cases it is also important that the machine is located via known site placement to interact with outside systems (such as, but not limited to, BIM).

In some embodiments, additional sensors may be added to aid with collision avoidance. These sensors would prevent the machine from encroaching on existing physical surroundings. This additional input would cause the machine posture to change during the move. If no acceptable posture existed then the user could be prevented from making the desired move.

Figure 2:
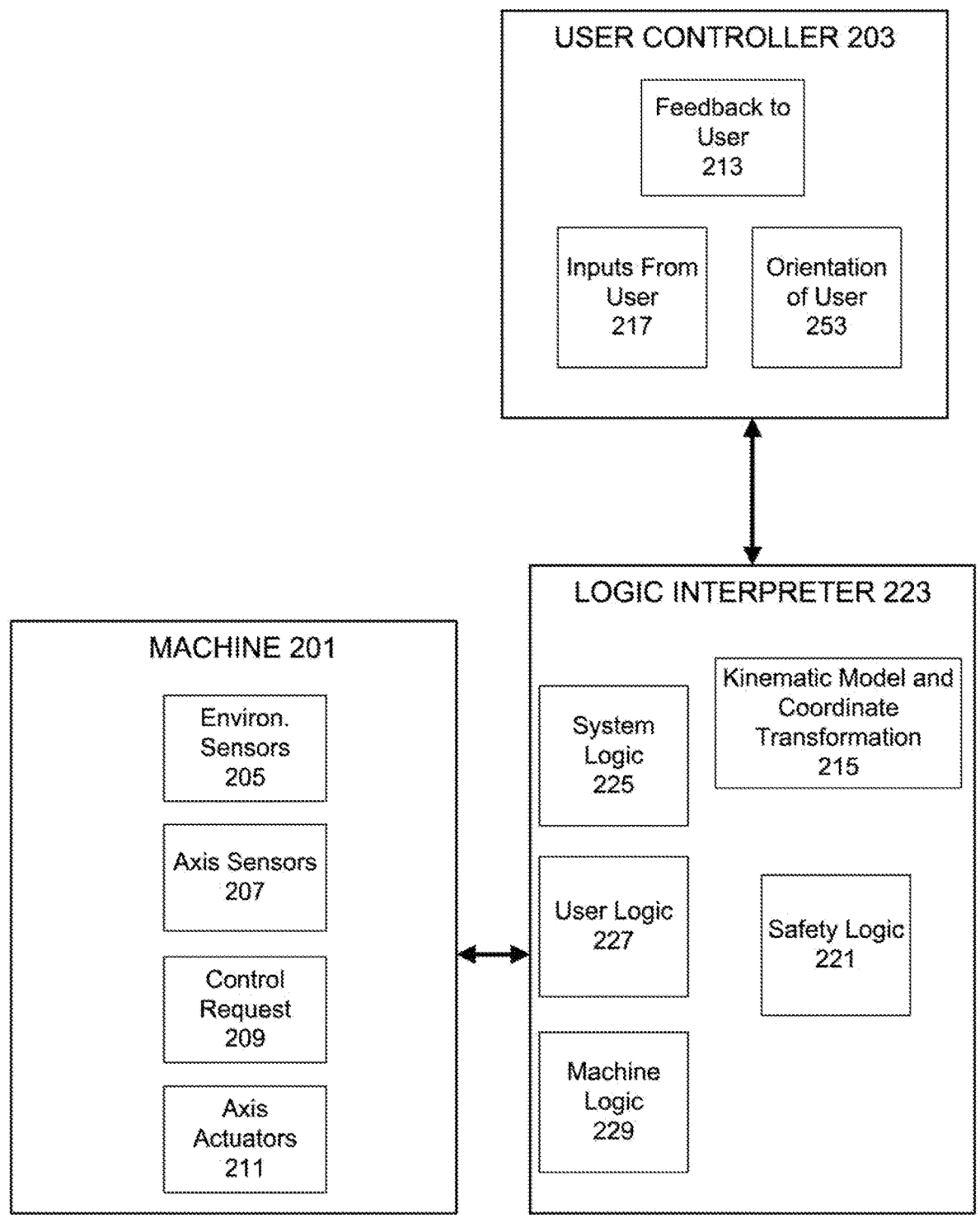
FIG. 2 is a block diagram depicting the components of a construction lift with a user controller of the present invention.

FIG. 2 is a block diagram depicting the components of a construction lift with a user controller of the present invention. For simplicity and case of explanation. FIG. 2 is broken into a machine 201, a user controller 203 and a logic interpreter 223. The machine 201 is the construction lift or the like, and includes environmental sensors 205 that provide information related to the working environment such as machine position, distance to obstacles, weather information, load weight, machine orientation, and the like. The sensors 205 may include laser range finders, CCD arrays and cameras, magnetometers, inclinometers, force sensors, and the like. Axis sensors 207 provide information to the machine about its moving components. These sensors allow the machine to know where its movable components are relative to the base structure. These sensors may include potentiometers, transducers, encoders, magnetometers, lasers, inclinometers, level sensors, and the like. Control request functionality 209 is received from the Logic Interpreter 223 where coordinates are transformed from a user perspective to a machine perspective. To facilitate movement of the construction lift, actuators 211 are driven by control request commands. The drive for the actuators 211 may be a digital command, a current source, a voltage source, a source of hydraulic pressure (a pump and cylinder arrangement, for example) or a source of pneumatic pressure (again, a pump and cylinder arrangement, for example). All of the inputs and outputs of machine 201 are translated through Logic Interpreter 223 before interfacing with user controller 203.

The User controller 203 includes hardware components such as levers, joysticks, touch screens, and the like. Haptic or visual feedback may also be provided through the user controller 203. In some embodiments, user controller 203 also contains an orientation sensor 253 that allows for the understanding of the controller's coordinate frame as compared to the machine's coordinate frame.

The logic controller 223 provides the computation power to convert user commands in one reference frame into commands that the machine can act upon. In some embodiments logic interpreter 223 may be integrated within machine 201 and its onboard control system. Input from the user 217 within the user controller 203 is then sent to the Kinematic model and Coordinate Transformation (model) 215 within logic interpreter 223. Logic interpreter 223 uses the model information along with System Logic 225. User Logic 227 and Safety Logic 221 to generate a command for machine 201. Based on the feedback within the system logic 225, machine logic 229 (partially from environmental sensors 205 and axis sensors 207) and safety logic 221, Logic interpreter 223 may compute that the commands cannot be completed due to machine factors (i.e. lack of travel, overloading), safety factor or other factors. This would then be transferred to user controller 203 as feedback to user 213.

The User controller 203 takes user inputs 217 from a hardware component such as a lever, joystick, touch screen, or the like, and provides them to a coordinate transformation routine 215. An appropriate analog to digital conversion process may also take place. In some embodiments of the present invention, and optionally, A Building Information Model (BIM) feeds data to the logic interpreter 223. Safety logic 221 is overlaid on the user controller and also provided to the machine 201.

Figure 3:
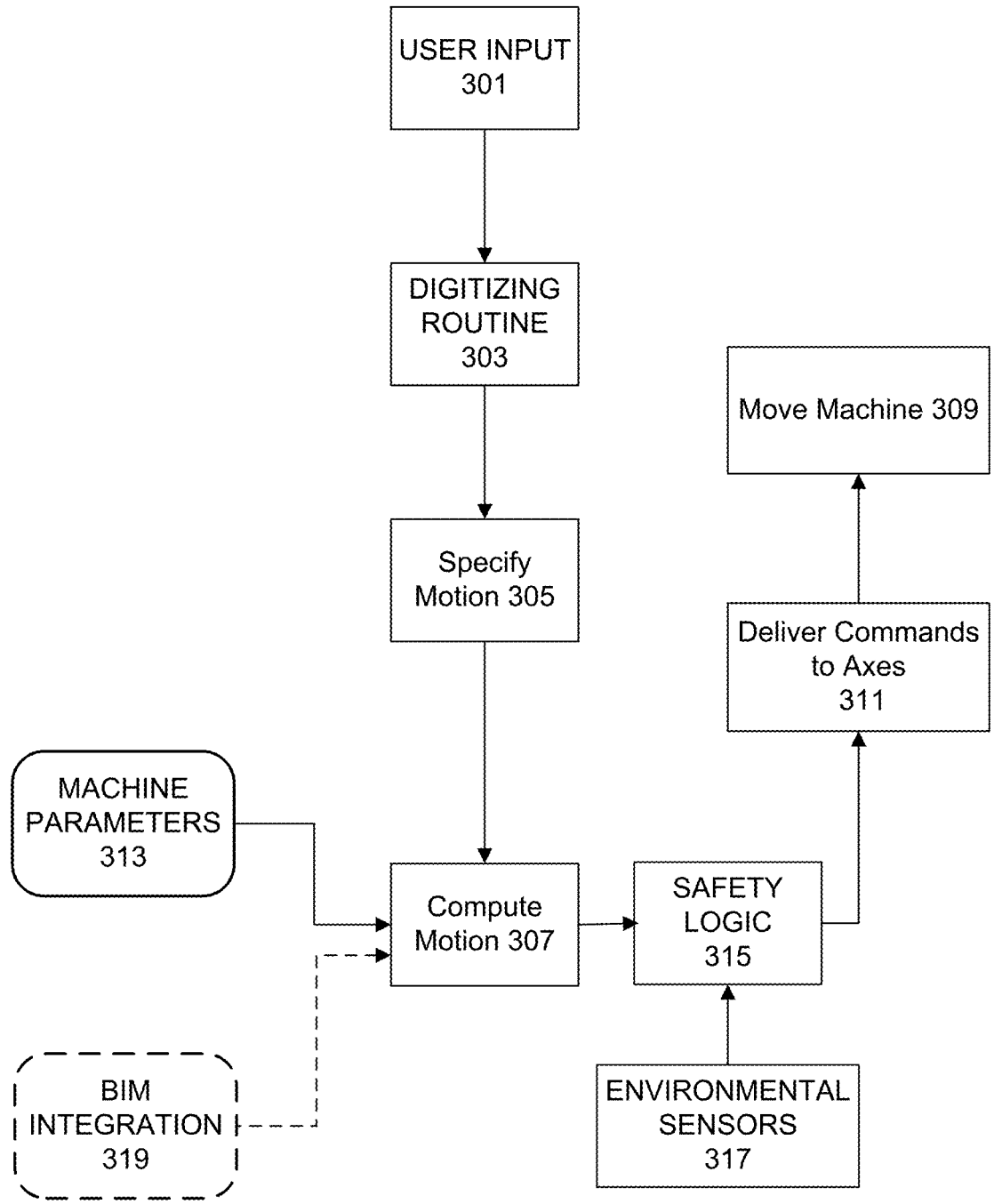
FIG. 3 is a data flow diagram of the present invention.

Turning now to FIG. 3, a data flow diagram of the present invention can be seen. User input 301 from a hardware component (lever, joystick, touch screen, or the like) is digitized in 303 and converted to a specified motion 305 that may, in some embodiments of the present invention, be library driven or based on a lookup, historical data, or pre-programmed data. Motion is then computed in 307 based on machine parameters 313 and BIM integration 319 in some embodiments. The computed motion 307 is analyzed with safety logic 315 based on feedback front environmental sensors 317 and if deemed allowable the signals needed to execute the specified motion are delivered to axes in 311. The machine is then executes movement in 309 in accordance with the specified motion 305.

Figure 4:
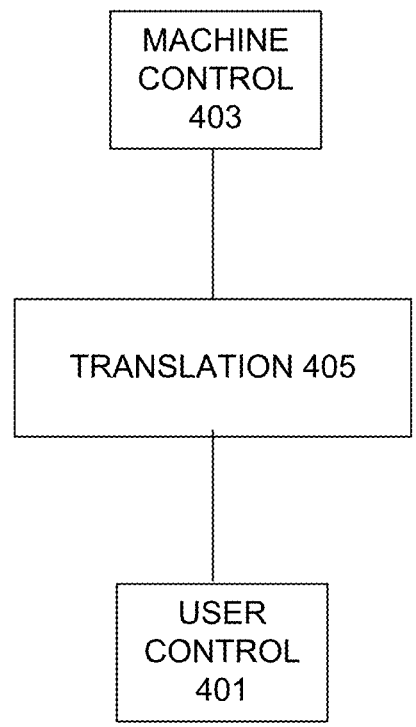
FIG. 4 is a control diagram of the present invention.

FIG. 4 is a control diagram of the present invention where user control 401 taken from a controller or control panel is translated in 405 to machine control 403 where amplitude and duration of motion at each joint is applied.

Figure 5:
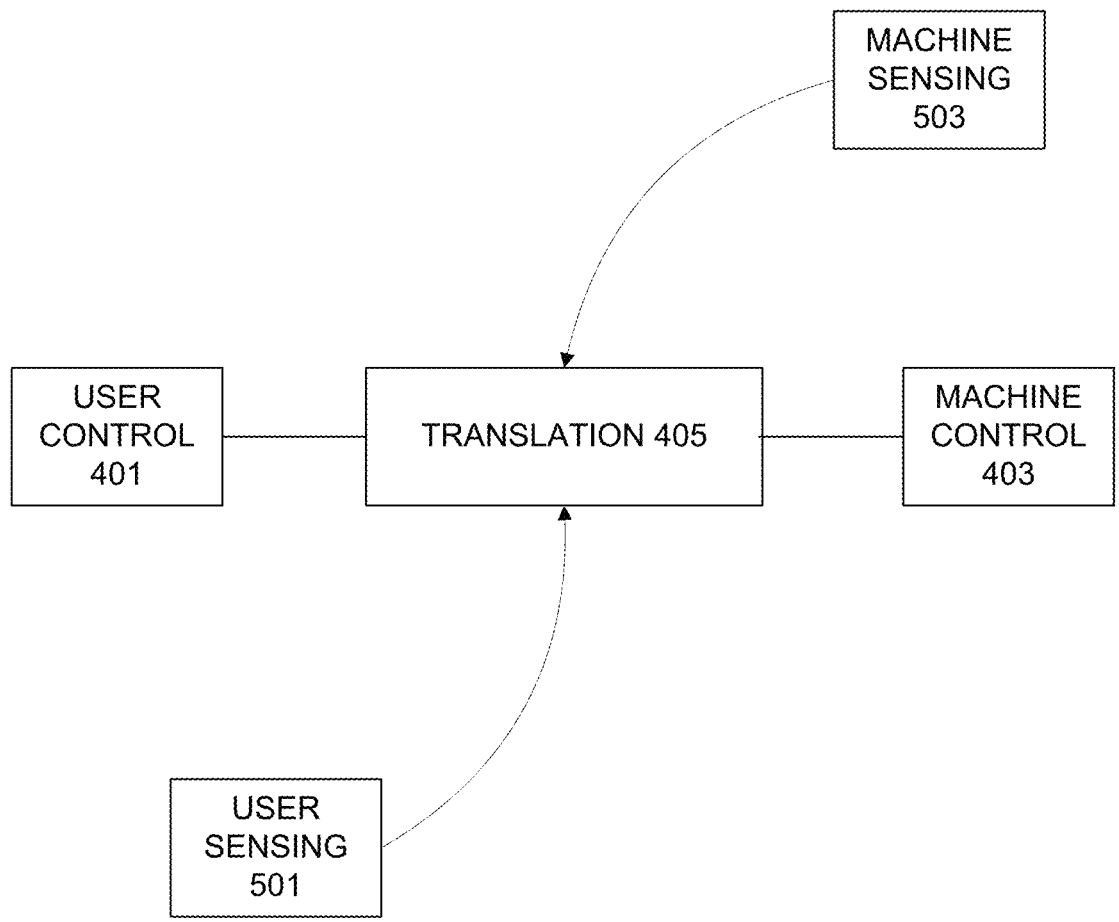
FIG. 5 is a control diagram of orientation control and sending of the present invention.

FIG. 5 is a control diagram of orientation control and sending of the present invention, as previously described herein. Machine sensing 503 and user sensing 501 are employed to provide orientation and relative position information to the translation component 405. As previously described, user control 401 is received and translated in 405 to machine control 403 where motion is expressed by the machine.

Figure 6:
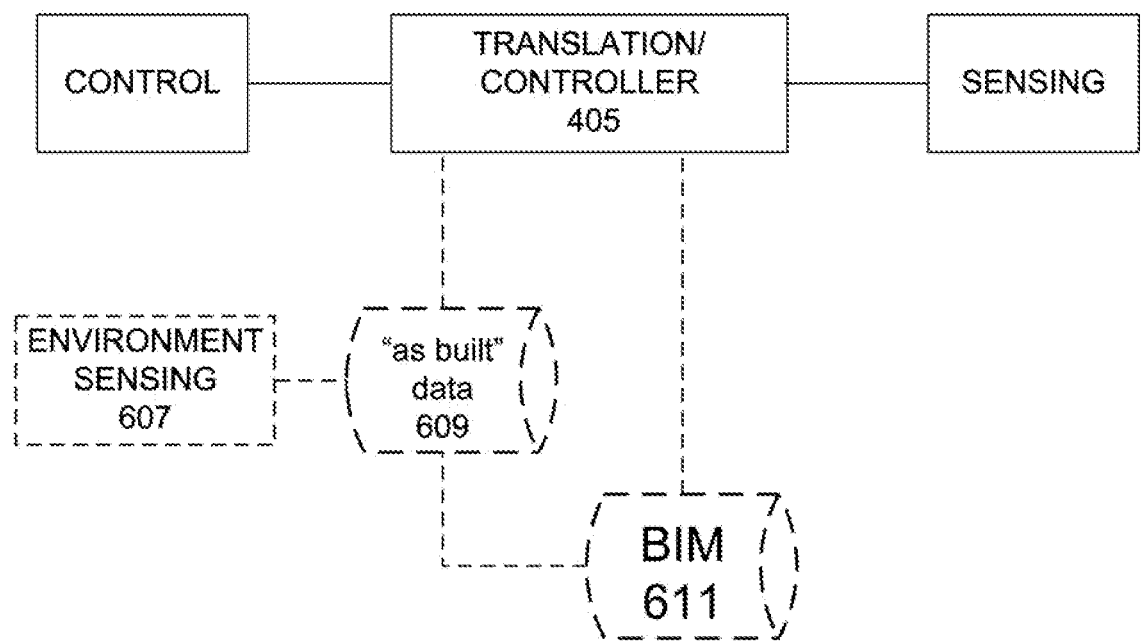
FIG. 6 is a block diagram of a further embodiment of the present invention.

FIG. 6 is a block diagram of a further embodiment of the present invention where a Building Information Model 611 (BIM) is optionally provided. BIM data is sent to the translation/controller 405 for subsequent processing and control. Additionally, and optionally, environment sensors 607 such as CCD arrays and cameras, laser devices, and the like, provide information on the "as built" environment in the form of"as built data" 609 that can in turn be used to update or reconcile with BIM data contained in a building information model 611.

The intuitive control system for construction lift equipment of the present invention converts user controller input such as input from a user interface device such as a joystick, a lever, a wheel, and a touch screen from the x-y coordinates of the user input into motion of the construction lift that is typically expressed as spherical coordinates. A user controller is operatively coupled to a logic interpreter and has a user interface device. The logic interpreter has a processor, memory, and access to computer readable media. In addition to the user interface device, the user controller has an orientation sensor to alert the user to the current orientation of the construction lift. The orientation sensor may be an inclinometer, a magnetometer, a coil, a CCD array, a digital camera system, an ultrasonic sensor, a level sensor, a potentiometer, a transducer, an encoder, a laser, a gyroscope, and a Global Positioning System sensor. The user controller also has a user feedback device such as a haptic device, a visual indicator, a touch screen, a computer display, or an audible device to provide vital real time information back to the user during operation of the construction lift. The construction lift itself has an axis sensor, such as a three dimensional axis sensor. The construction lift also has an axis actuator such as a linear, hydraulic or pneumatic actuator to facilitate movement of the construction lift in the direction(s) commanded by the user through the user interface. The construction lift also has one or more environmental sensors such as an inclinometer, a magnetometer, a coil, a CCD array, a digital camera system, an ultrasonic sensor, a level sensor, a potentiometer, a transducer, an encoder, a laser, a gyroscope, and a Global Positioning System sensor to provide position, velocity and acceleration information to the user through the user interface. A control request function is embodied in a software program and provides for overall control of movement of the construction lift. A logic interpreter is operatively coupled to the control request function of the construction lift and contains or otherwise has access to system logic, user logic, machine logic, safety logic, a kinematic model and coordinate transformation logic. The coordinate transformation logic converts spherical coordinates to X-Y coordinates.

It is, therefore, apparent that there has been provided, in accordance with the various objects of the present invention, an intuitive control system for construction equipment such as, but not limited to, lift equipment.

While the various objects of this invention have been described in conjunction with preferred embodiments thereof, it evident that many alternatives, modifications, and variations will be apparent to those skilled in the art. Accordingly, it is intended to embrace all such alternatives, modifications and variations that fall within the spirit and broad scope of this specification, claims, and drawings appended herein.

What is claimed is:

1. An intuitive control system for construction lift equipment comprising:
   a construction lift comprising an axis sensor, an axis actuator, an environmental sensor, and a control request function;
   a logic interpreter operatively coupled to the control request function of the construction lift and comprising system logic, user logic, machine logic, safety logic, a kinematic model and coordinate transformation logic; and
   a user controller operatively coupled to the logic interpreter and comprising a user interface device, an orientation sensor, and a user feedback device;
   wherein the environmental sensor is selected from a group consisting of an inclinometer, a magnetometer, a coil, a CCD array, a digital camera system, an ultrasonic sensor, a level sensor, a potentiometer, a transducer, an encoder, a laser, a gyroscope, and a Global Positioning System sensor.

2. An intuitive control system for construction lift equipment comprising:
   a construction lift comprising an axis sensor, an axis actuator, an environmental sensor, and a control request function;
   a logic interpreter operatively coupled to the control request function of the construction lift and comprising system logic, user logic, machine logic, safety logic, a kinematic model and coordinate transformation logic; and
   a user controller operatively coupled to the logic interpreter and comprising a user interface device, an orientation sensor, and a user feedback device;
   wherein the user interface device is selected from a group consisting of a joystick, a lever, a wheel, and a touch screen.

3. An intuitive control system for construction lift equipment comprising:
   a construction lift comprising an axis sensor, an axis actuator, an environmental sensor, and a control request function;
   a logic interpreter operatively coupled to the control request function of the construction lift and comprising system logic, user logic, machine logic, safety logic, a kinematic model and coordinate transformation logic; and
   a user controller operatively coupled to the logic interpreter and comprising a user interface device, an orientation sensor, and a user feedback device;
   wherein the orientation sensor is selected from a group consisting of an inclinometer, a magnetometer, a coil, a CCD array, a digital camera system, an ultrasonic sensor, a level sensor, a potentiometer, a transducer, an encoder, a laser, a gyroscope, and a Global Positioning System sensor.

4. An intuitive control system for construction lift equipment comprising:
   a construction lift comprising an axis sensor, an axis actuator, an environmental sensor, and a control request function;
   a logic interpreter operatively coupled to the control request function of the construction lift and comprising system logic, user logic, machine logic, safety logic, a kinematic model and coordinate transformation logic; and
   a user controller operatively coupled to the logic interpreter and comprising a user interface device, an orientation sensor, and a user feedback device;
   wherein the user feedback device is selected from a group consisting of a haptic device, a visual indicator, a touch screen, a computer display, and an audible device.

5. An intuitive control system for construction lift equipment comprising:
   a construction lift comprising an axis sensor, an axis actuator, an environmental sensor, and a control request function;
   a logic interpreter operatively coupled to the control request function of the construction lift and comprising system logic, user logic, machine logic, safety logic, a kinematic model and coordinate transformation logic;
   a building information model configured to provide data to the logic interpreter; and
   a user controller operatively coupled to the logic interpreter and comprising a user interface device, an orientation sensor, and a user feedback device;
   wherein the axis actuator is selected from a group consisting of a linear actuator, a hydraulic actuator, and a pneumatic actuator.

6. An intuitive control system for construction lift equipment comprising:
   a construction lift comprising an axis sensor, an axis actuator, an environmental sensor, and a control request function;
   a logic interpreter operatively coupled to the control request function of the construction lift and comprising system logic, user logic, machine logic, safety logic, a kinematic model and coordinate transformation logic;
   a building information model configured to provide data to the logic interpreter; and
   a user controller operatively coupled to the logic interpreter and comprising a user interface device, an orientation sensor, and a user feedback device;

wherein the environmental sensor is selected from a group consisting of an inclinometer, a magnetometer, a coil, a CCD array, a digital camera system, an ultrasonic sensor, a level sensor, a potentiometer, a transducer, an encoder, a laser, a gyroscope, and a Global Positioning System sensor.

7. An intuitive control system for construction lift equipment comprising:
- a construction lift comprising an axis sensor, an axis actuator, an environmental sensor, and a control request function;
- a logic interpreter operatively coupled to the control request function of the construction lift and comprising system logic, user logic, machine logic, safety logic, a kinematic model and coordinate transformation logic;
- a building information model configured to provide data to the logic interpreter; and
- a user controller operatively coupled to the logic interpreter and comprising a user interface device, an orientation sensor, and a user feedback device;
- wherein the user interface device is selected from a group consisting of a joystick, a lever, a wheel, and a touch screen.

8. An intuitive control system for construction lift equipment comprising:
- a construction lift comprising an axis sensor, an axis actuator, an environmental sensor, and a control request function;
- a logic interpreter operatively coupled to the control request function of the construction lift and comprising system logic, user logic, machine logic, safety logic, a kinematic model and coordinate transformation logic;
- a building information model configured to provide data to the logic interpreter; and
- a user controller operatively coupled to the logic interpreter and comprising a user interface device, an orientation sensor, and a user feedback device;
- wherein the orientation sensor is selected from a group consisting of an inclinometer, a magnetometer, a coil, a CCD array, a digital camera system, an ultrasonic sensor, a level sensor, a potentiometer, a transducer, an encoder, a laser, a gyroscope, and a Global Positioning System sensor.

9. An intuitive control system for construction lift equipment comprising:
- a construction lift comprising an axis sensor, an axis actuator, an environmental sensor, and a control request function;
- a logic interpreter operatively coupled to the control request function of the construction lift and comprising system logic, user logic, machine logic, safety logic, a kinematic model and coordinate transformation logic;
- a building information model configured to provide data to the logic interpreter; and
- a user controller operatively coupled to the logic interpreter and comprising a user interface device, an orientation sensor, and a user feedback device;
- wherein the user feedback device is selected from a group consisting of a haptic device, a visual indicator, a touch screen, a computer display, and an audible device.

* * * * *